(12) United States Patent
Lee et al.

(10) Patent No.: US 8,451,769 B2
(45) Date of Patent: May 28, 2013

(54) METHOD OF RECEIVING MESSAGE IN COMMUNICATION SYSTEM USING RELAY PROCESS BEING LIMITED TO WIRELESS INTERFACE AND APPARATUS OF THE SAME

(75) Inventors: Young Dae Lee, Anyang-si (KR); Sung Hoon Jung, Incheon-si (KR); Seung June Yi, Sungnam-si (KR); Sung Duck Chun, Sungnam-si (KR); Sung Jun Park, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 281 days.

(21) Appl. No.: 13/026,149

(22) Filed: Feb. 11, 2011

(65) Prior Publication Data

US 2011/0194484 A1   Aug. 11, 2011

Related U.S. Application Data

(60) Provisional application No. 61/303,650, filed on Feb. 11, 2010.

(51) Int. Cl.
*H04B 7/14* (2006.01)

(52) U.S. Cl.
USPC ...... 370/315; 370/328; 455/456.5; 455/456.6

(58) Field of Classification Search
USPC .......................................... 370/315, 255, 338
See application file for complete search history.

(56) References Cited

U.S. PATENT DOCUMENTS

| | | | |
|---|---|---|---|
| 8,289,895 B2* | 10/2012 | Yu et al. | 370/315 |
| 8,300,555 B2* | 10/2012 | Horn et al. | 370/255 |
| 2004/0213214 A1* | 10/2004 | Jung et al. | 370/352 |
| 2009/0124259 A1* | 5/2009 | Attar et al. | 455/436 |
| 2009/0232067 A1* | 9/2009 | Pajukoski et al. | 370/329 |

* cited by examiner

*Primary Examiner* — Andrew Lai
*Assistant Examiner* — Sumitra Ganguly
(74) *Attorney, Agent, or Firm* — Lee, Hong, Degerman, Kang & Waimey

(57) ABSTRACT

A method of receiving a message by a relay node in a mobile communication system is disclosed. The present invention includes receiving control information including a first group identifier on a backhaul subframe, and receiving the message based on the control information if the received first group identifier indicates the relay node, wherein the message includes a second group identifier, the second group identifier being corresponded to the first group identifier.

22 Claims, 9 Drawing Sheets

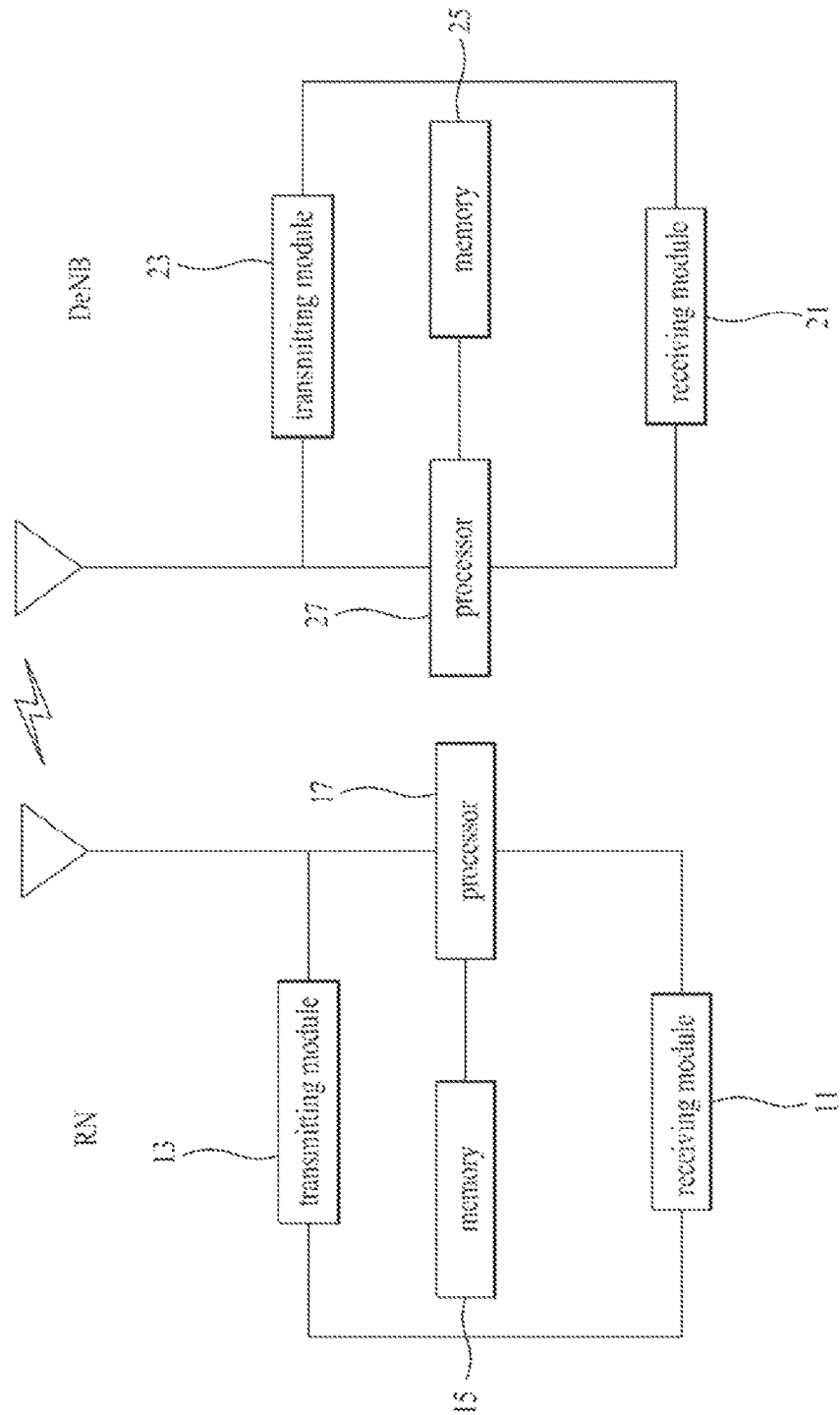

METHOD OF RECEIVING MESSAGE IN COMMUNICATION SYSTEM USING RELAY PROCESS BEING LIMITED TO WIRELESS INTERFACE AND APPARATUS OF THE SAME

CROSS-REFERENCE TO RELATED APPLICATIONS

Pursuant to 35 U.S.C. §119(e), this application claims the benefit of U.S. Provisional Patent Application Ser. No. 61/303,650, filed on Feb. 11, 2010, the contents of which are hereby incorporated by reference in their entirety.

BACKGROUND OF THE INVENTION

1. Field of the Invention

The present invention relates to a method of receiving a message in a communication system using a relay process limited to a wireless interface and an apparatus for the same.

2. Discussion of the Related Art

Mobile communication systems are evolving extensively in order to provide diverse types of communication services, such as audio and video data, and so on. Generally, a mobile communication system corresponds to a multiple access system that shares available system resource (e.g., bandwidth, transmission power, and so on) so as to be capable of supporting communication between multiple users. Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi carrier frequency division multiple access (MC-FDMA) system, and so on.

SUMMARY OF THE INVENTION

Accordingly, the present invention is directed to a method of receiving a message in a communication system using a relay process limited to a wireless interface and an apparatus for the same that substantially obviate one or more problems due to limitations and disadvantages of the related art.

Another object of the present invention is to provide a method of receiving a message in a communication system using a relay process limited to a wireless interface and an apparatus for the same that can efficiently use the wireless (or radio) resource.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described, a method of receiving a message by a relay node in a mobile communication system, includes receiving control information including a first group identifier on a backhaul subframe; and receiving the message based on the control information if the received first group identifier indicates the relay node, wherein the message includes a second group identifier, the second group identifier being corresponded to the first group identifier.

Preferably, the first group identifier is assigned by a base station or a mobility management entity (MME).

Preferably, the second group identifier is assigned by the base station or the MME.

Preferably, the base station or the MME assigns a plurality of second group identifiers including the second group identifier to the relay node.

Preferably, the relay node belongs to a plurality of relay node group, and each of the plurality of second group identifiers corresponds to each of the plurality of relay node group.

Preferably, the backhaul subframe is a MBSFN (Multicast/Broadcast over a Single Frequency Network) subframe.

Preferably, the message is retransmitted by the base station or the MME according to a hybrid automatic repeat request (HARQ) operation.

Preferably, a feedback of the message is not transmitted.

Preferably, the control information is received through a R-PDCCH (Relay-Physical Downlink Control Channel), and the message is received through a R-PDSCH (Relay-Physical Downlink Shared Channel).

Preferably, the message is one of a paging message, a MME (mobility management entity) configuration update message, an overload start message, an overload stop message, a write-replace warning request message and a kill request message over an S1 interface.

Preferably, the message is one of a load information message, an error indication message and a base station configuration update message over an X2 interface.

To further achieve these and other advantages and in accordance with the purpose of the present invention, a method of transmitting a message by a network node in a mobile communication system, includes transmitting, to a relay node, control information including a first group identifier indicating the relay node on a backhaul subframe; and transmitting the message to the relay node, wherein the message includes a second group identifier, the second group identifier being corresponded to the first group identifier.

Preferably, the method further includes assigning the first group identifier to the relay node.

Preferably, the method further includes assigning the second group identifier to the relay node.

Preferably, the method further includes assigning a plurality of second group identifiers including the second group identifier to the relay node.

Preferably, the relay node belongs to a plurality of relay node group, and each of the plurality of second group identifiers corresponds to each of the plurality of relay node group.

Preferably, the backhaul subframe is a MBSFN (Multicast/Broadcast over a Single Frequency Network) subframe.

Preferably, the method further includes retransmitting the message to the relay node according to a hybrid automatic repeat request (HARQ) operation.

Preferably, a feedback of the message is not transmitted by the relay node.

Preferably, the control information is transmitted through a R-PDCCH (Relay-Physical Downlink Control Channel), and the message is transmitted through a R-PDSCH (Relay-Physical Downlink Shared Channel).

Preferably, the message is one of a paging message, a MME (mobility management entity) configuration update message, an overload start message, an overload stop message, a write-replace warning request message and a kill request message over an S1 interface.

Preferably, the message is one of a load information message, an error indication message and a base station configuration update message over an X2 interface.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 illustrates RN and DeNB configurations according to an embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. For example, the present invention will be described as follows provided that a 3GPP LTE based system will be given as an example of the mobile communication system according to the present invention. However, the present invention may also be applied in diverse types of mobile communication systems, such as an IEEE 802.16 based system.

First of all, as an example of a mobile communication system wherein the present invention is applied, the 3GPP LTE system will be described in detail.

Figure 1:
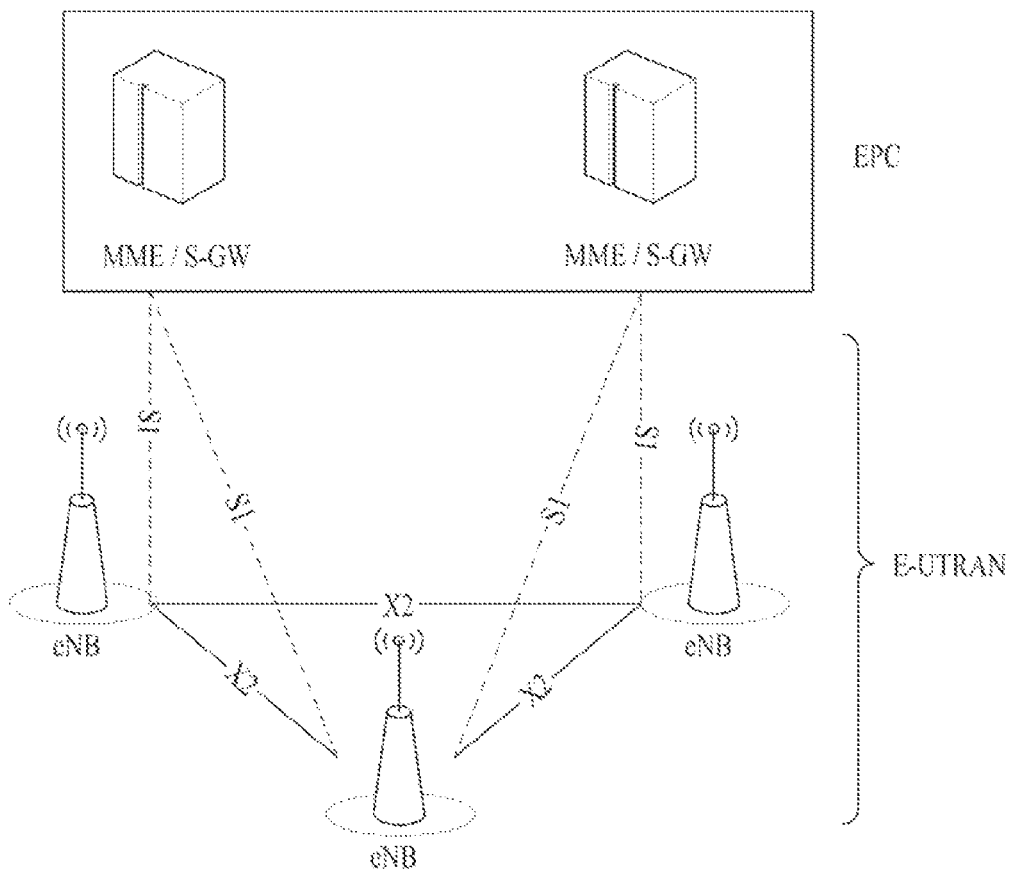
FIG. 1 illustrates an exemplary structure of an Evolved Universal Mobile Telecommunication System (E-UMTS), which corresponds to an example of a mobile communication system adopting the present invention.

FIG. 1 illustrates an exemplary structure of an Evolved Universal Mobile Telecommunication System (E-UMTS). The E-UMTS corresponds to an evolved version of the conventional UMTS, and the standardization procedure for the E-UMTS is currently under process in the 3GPP system. The E-UMTS is also referred to as a Long Term Evolution (LTE) system. The E-UMTS includes an Evolved Terrestrial Radio Access Network (E-UTRAN). Herein, the Evolved Terrestrial Radio Access Network (E-UTRAN) is configured of a plurality of base stations (or evolved-NodeBs, hereinafter referred to as eNBs). And, each eNB is connected to one another by wire over an X2 interface. Herein, the eNB is connected to a user equipment (UE) over a wireless (or radio) interface, and the eNB is connected to an Evolved Packet Core (EPC) by wire over an S1 interface.

The Evolved Packet Core (EPC) is configured of a Mobility Management Entity (MME), a Serving-Gateway (S-GW), and a Packet Data Network-Gateway (PDN-GW). The MME carries access information of the user equipment (UE) or information on the capability of the user equipment. Such information is mainly used for managing the mobility of the user equipment. The S-GW corresponds to a gateway having the E-UTRAN as its end-point, and the PDN-GW corresponds to a gateway having the PDN as its end-point.

A control message being exchanged by eNBs over the X2 interface uses an X2 Application Part (X2AP) protocol and is referred to as an X2AP message. Also, a control message being exchanged by the MME and the eNB over the S1 interface uses an S1 Application Part (S1AP) and is referred to as an S1AP message.

Layers of a Radio Interface Protocol between the UE and the eNB may be categorized as a first layer (L1), a second layer (L2), and a third layer (L3), based upon 3 lower layers of an Open System Interconnection (OSI) reference model, which is widely known in the communication system. Herein, a physical layer belonging to the first layer provides Information Transfer Service, which uses a physical channel. And, a Radio Resource Control (RRC) located in the third layer performs the role of controlling the radio (or wireless) resource between the user equipment (UE) and the network. In order to do so, the RRC layer exchanges an RRC message between the user equipment (UE) and the eNB. Meanwhile, when using a technique for relaying data between the UE and the eNB, since a smooth communication cannot be realized if the distance between the UE and the eNB is too far, a relay process has been adopted in order to complement such disadvantage. Hereinafter, a relay node (RN), which is an element of the relay process, and an interface related to the RN will be briefly described with reference to FIG. 2.

Figure 2:
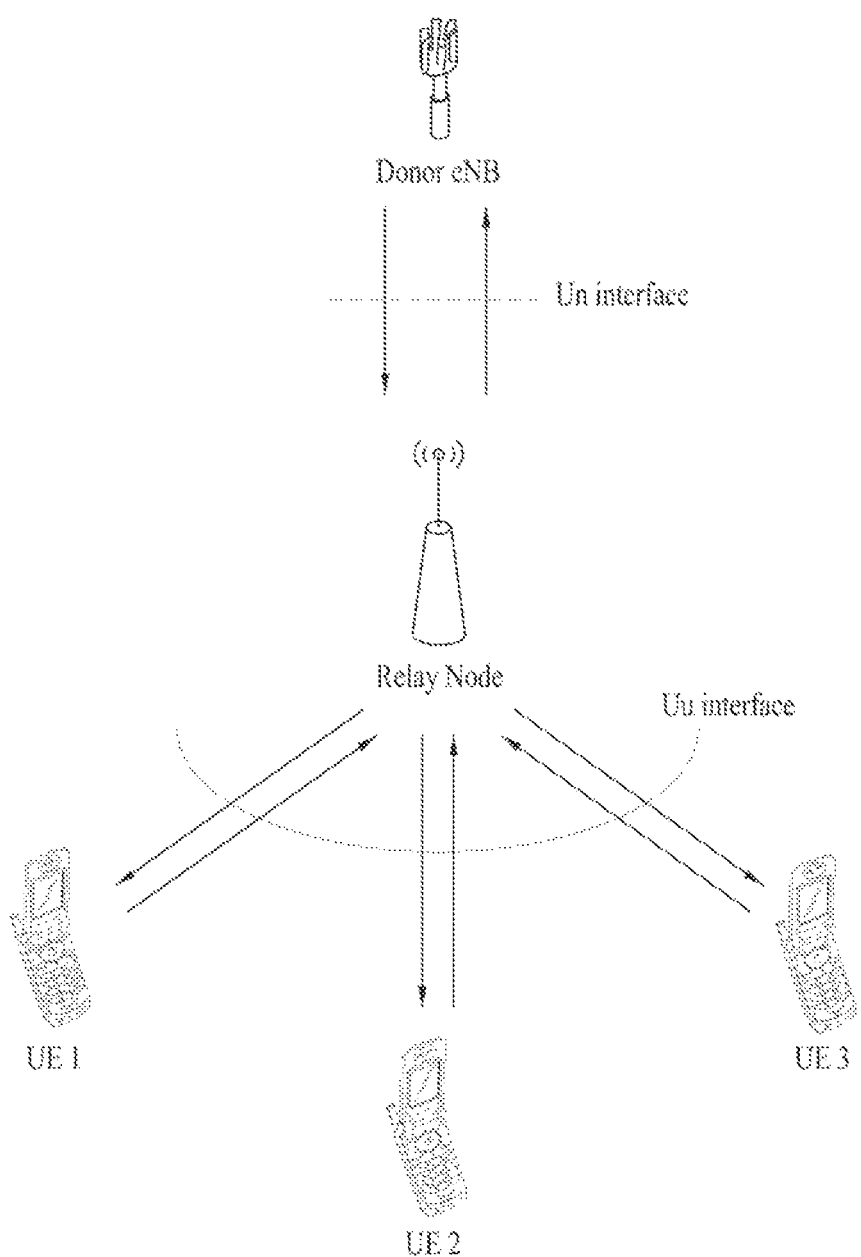
FIG. 2 illustrates a Relay node (RN) and a Un interface between a RN and an eNB wherein the present invention is applied.

FIG. 2 illustrates a Relay Node (RN) and a Un interface between a RN and an eNB wherein the present invention is applied.

A relay process refers to a technique for relaying data between the UE and the eNB. Since a smooth communication cannot be realized if the distance between the UE and the eNB is too far, the relay process is applied in order to complement such disadvantage. In order to perform the above-described relay process, a new wireless device, which is referred to as a relay device or a relay node (hereinafter referred to as RN) is provided between the user equipment (UE) and the eNB. Most particularly, the eNB that manages the RN is referred to as a Donor eNB (hereinafter referred to as DeNB). Also, an interface that is newly created between the RN and the DeNB, is defined as an Un interface. Herein, the Un interface is differentiated from an Uu interface, which corresponds to the interface between the UE and the RN. The RN may perform the role of managing the UE instead of the DeNB. More specifically, in the perspective of the UE, the RN may be recognized as the DeNB, and the Uu interface between the UE and the RN, may use the MAC/RLC/PDCP/RRC, which respectively correspond to the Uu interface protocol. Depending upon the circumstances, in the perspective of the DeNB, the RN may be recognized as the UE or as the eNB. More specifically, when the RN first accesses the DeNB (i.e., when the RN is first connected to the DeNB), since the DeNB is incapable of recognizing the existence of the RN, the RN accesses the DeNB via random access, which is similar to the UE. Then, after accessing the DeNB, the RN operates as the eNB, which manages the UE which is connected to the RN. Therefore, the Un interface protocol may be defined to have both the function of a network protocol and the function of the Uu interface protocol.

The Un interface may be divided into an inband and an outband. In case the Un interface corresponds to the outband, the Un interface and the Uu interface each uses a different frequency band. Conversely, in case the Un interface corresponds to the inband, both the Un interface and the Uu interface use the same frequency band. Accordingly, when the Un interface corresponds to the inband, wherein both the Un interface and the Uu interface use the same frequency band, an interference may occur between the transmitter and the receiver of the RN. For example, when the RN transmits data to the DeNB, and when the RN receives data from the UE at the same time, an interference may occur. In order to resolve such problem of interference, a Backhaul subframe is introduced, which may be used for backhaul partitioning. And, the backhaul subframe may be set up as a Multicast/Broadcast over a Single Frequency Network (MBSFN) subframe. This will be described in more detail when describing the subframe structure with reference to FIG. 5 to FIG. 6.

Meanwhile, unlike most of the wireless network interfaces (or radio network interfaces) that transmit high capacity data via wired transmission, since the Un interface between the RN and the DeNB uses wireless (or radio) resource, it is important to efficiently use the limited wireless (or radio) resource. The method and device for efficiently using such limited wireless (or radio) resources will bow be described in detail with reference to FIG. 8 to FIG. 9.

Figure 3:
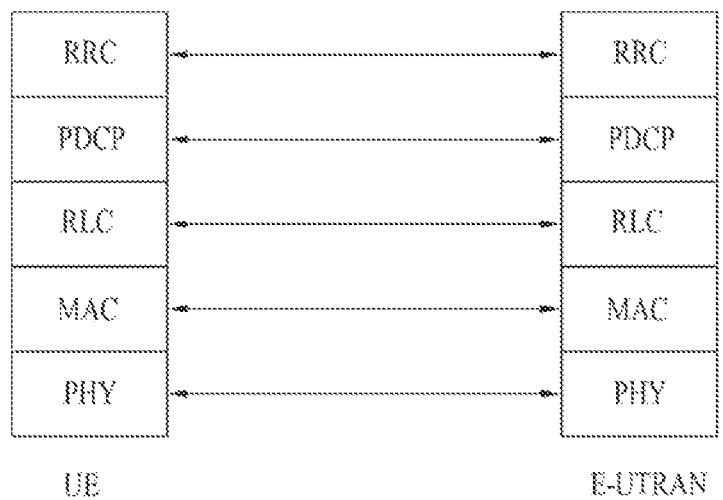
FIG. 3 and FIG. 4 respectively illustrate the structure of a Radio Interface Protocol between a UE and a E-UTRAN based upon a 3GPP wireless (or radio) access network standard wherein the present invention is applied.
Figure 4:
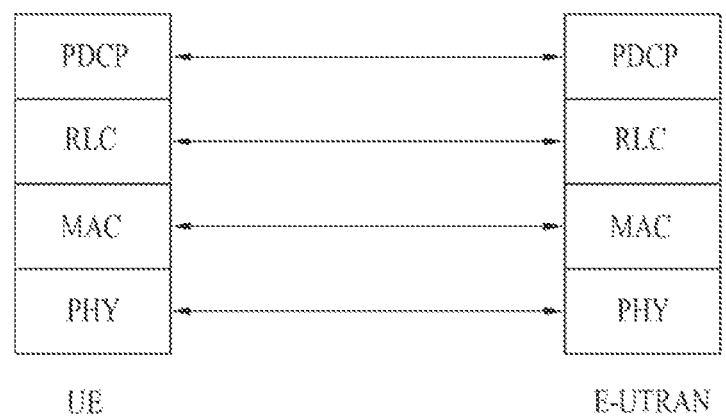

FIG. 3 and FIG. 4 respectively illustrate the structure of a Wireless (or Radio) Interface Protocol between an UE and an E-UTRAN based upon a 3GPP wireless (or radio) access network standard wherein the present invention is applied. As described above, since the Un interface protocol between the RN and the DeNB is defined as a structure having the functions of a network protocol added to the functions of the related art Uu interface protocol (i.e., MAC/RLC/PDCP/RRC), the Un interface protocol adopts the structure of an interface protocol between the UE and the E-UTRAN. Accordingly, hereinafter, the structure of the interface protocol between the UE and the E-UTRAN will now be briefly described. A wireless (or radio) interface protocol horizontally consists of a physical layer, a data link layer, and a network layer, and vertically consists of a user plane (or U-Plane) for data information transmission and a control plane (or C-Plane) for delivering control signals (or signaling). The protocol layers shown in FIG. 3 and FIG. 4 may be divided into a first layer (L1), a second layer (L2), and a third layer (L3), based upon 3 lower layers of an Open System Interconnection (OSI) reference model, which is widely known in the communication system.

Such wireless protocol layers exist in pairs in the RN and the E-UTRAN, and each layer perform the role of transmitting data of the wireless section.

Hereinafter, each layer of the wireless protocol control plane of FIG. 3 and the wireless protocol user plan of FIG. 4 will be described in detail.

The first layer (L1), which corresponds to a physical layer, uses a physical channel to provide an Information Transfer Service to a higher layer. The physical layer is connected to a medium access control layer, which corresponds to a higher layer, through a transport channel. And, herein, data is transported between the medium access layer and the physical layer through the transport channel. In a data transmission between different physical layers, i.e., in a data transmission between a physical layer of the transmitting end and a physical layer of the receiving end, data is transported between the physical layers through a physical channel. Herein, the physical layer is modulated by using Orthogonal Frequency Division Multiplexing (OFDM) and uses time and frequency as the wireless resource.

A Medium Access Control (MAC) of the second layer (L2) provides services to a Radio Link Control layer, which corresponds to higher layer, through a logical channel. The Radio Link Control (RLC) layer of the second layer (L2) supports the transmission of reliable data. The function of the RLC layer may also be realized by a functional block within the MAC. In order to efficiently perform transmission in a radio section having a narrow bandwidth when transmitting an IP packet, such as an IPv4 or IPv6, a PDCP layer of the second layer (L2) performs a function of header compression, which can reduce the size of an IP packet header having a relatively large size and carrying unnecessary control information.

A radio resource control (RRC) layer which is positioned in the uppermost portion of the third layer (L3) is defined only in the control plane. And, in relation with the configuration, re-configuration, and release of radio bearers (RBs), the RRC layer of the third layer (L3) performs the role of controlling the logical channels, the transmission channels, and the physical channels. The RB refers to a service that is provided by the second layer (L2) in order to deliver data between the UE and the E-UTRAN. In case an RRC connection exists between the RRC layer of the UE and the RRC layer of the E-UTRAN, the RN remains in the RRC connection state (i.e., RRC_CONNECTED). Alternatively, in case the RRC connection does not exist between the RRC layer of the UE and the RRC layer of the E-UTRAN, is in an idle state (i.e., RRC_IDLE).

In the network, downlink transmission channels that transmit data to the UE include a broadcast channel (BCH), which transmits system information, and a downlink shared channel (SCH), which transmits information other than the system information, such as user traffic or control messages. In case of traffic information or control messages of a downlink multicast or broadcast service, the corresponding data may be transmitted through a downlink SCH or may also be transmitted through a separate downlink multicast channel (MCH). Meanwhile, uplink transmission channels that transmit data to the UE include a random access channel (RACH), which transmits initial control messages, and an uplink shared channel (SCH), which transmits information other than the system information, such as user traffic or control messages.

Logical channels being in a level higher than the transmission channel and being mapped to the transmission channel include a Broadcast Channel (BCCH), a Paging Control Channel (PCCH), a Common Control Channel (CCCH), a Multicast Control Channel (MCCH), a Multicast Traffic Channel (MTCH), and so on.

A wireless (or radio) frame includes a plurality of subframes. One subframe is configured of a plurality of resource blocks, and one resource block is configured of a plurality of symbols and a plurality of subcarriers. A Physical Downlink Control Channel (PDCCH), i.e., an L1/L2 control channel may use specific subcarriers of specific symbols on a subframe so as to perform transmission. One slot corresponds to 0.5 ms, and a Transmission Time Interval (TTI) that indicates a unit time during which the data are being transmitted, is equal to 1 ms, which corresponds to 2 slots. Hereinafter, a subframe and, more particularly, the relation between a downlink subframe and a PDCCH and the relation between a Backhaul subframe for the RN and a Relay-Physical Downlink Control Channel (R-PDCCH) will now be described in detail with reference to FIG. 5 and FIG. 6.

The following description describes the system information. Herein, the system information includes essential information that is required for the access of the UE to the eNB. Therefore, prior to accessing the eNB, the UE is required to receive all system information and is always required carry the most recent system information. Since the system information corresponds to information that should be known by all UEs existing within a single cell, the eNB periodically transmits the system information. The system information may be divided into a Master Information Block (MIB), a Schedule Block (SB), a System Information Block (SIB), and so on. The MIB informs the UE of the physical configuration (e.g., bandwidth) of the corresponding cell. The SB corresponds to a group of system information each being related to one another. For example, a particular SIB includes only the information on the neighboring cells, and another particular SIB includes only the information on an uplink wireless (or radio) channel that is used by the UE.

Hereinafter, an RRC state of the UE and a method of connecting RRC will now be described in detail. The RRC state refers to whether or not the RRC of a user equipment (UE) is in a logical connection with the RRC of a E-UTRAN. In case the RRCs are logically connected to one another, the RRC state is indicated as an RRC_CONNECTED state. And, in case the RRCs are not logically connected to one another, the RRC state is indicated as RRC_IDLE state. Since an RRC connection exists in the UE of the RRC_CONNECTED state, the E-UTRAN may recognize the existence of the corresponding user equipment (UE) in the cell unit and may effectively control the user equipment (UE). Conversely, the E-UTRAN is incapable of recognizing the UE of the RRC_IDLE state. And, herein, an EPC manages the UE in Tracking Area units, which correspond to area units larger than the cell units. More specifically, the presence or absence of the RRC_IDLE state UE may only be recognized in large area units. And, in order to receive generic mobile communication services, such as sound (or audio data) or data, the RRC should be shifted to the RRC_CONNECTED state. When the user initially turns on the power of the UE, the UE searches for an adequate cell and remains in the RRC_IDLE state within the corresponding cell. Once the UE that was in the RRC Idle state is required to make an RRC connection, the RRC of the UE can then make an RRC connection with the RRC of the E-UTRAN through an RRC connection establishment procedure, thereby shifting to the RRC_CONNECTED state. Examples of when the UE, which was in the RRC_IDLE state, is required to make an RRC connection includes a case when an uplink data transmission is required due to reasons, such as the user's attempt to make a phone call, or a case when a response message transmission is required to be made after receiving a paging message from the E-UTRAN.

A Non-Access Stratum (NAS) layer, which is in a level higher than the RRC layer, performs the functions of session management and mobility management.

Figure 5:
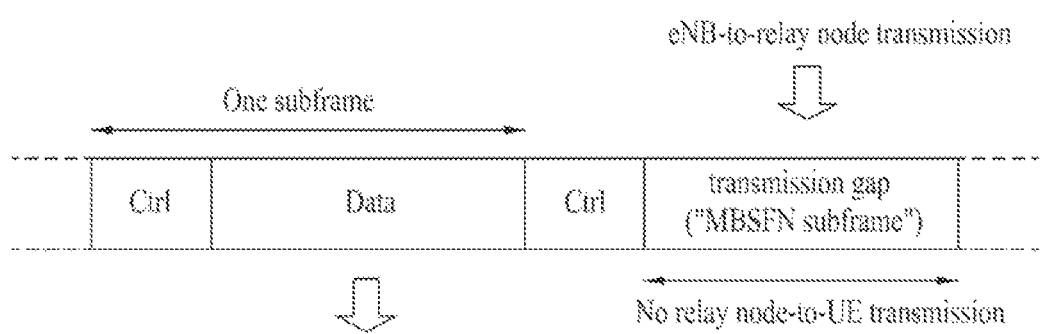
FIG. 5 illustrates the structure of a wireless (or radio) frame wherein the present invention is applied.

FIG. 5 illustrates the structure of a wireless (or radio) frame wherein the present invention is applied. Referring to FIG. 5, the subframe positioned on the left side corresponds to a generic subframe, and the subframe positioned on the right side corresponds to a Backhaul subframe having the structure of an MBSFN subframe configured therein. Hereinafter, the structures of each subframe will be briefly described with reference to FIG. 6.

Figure 6:
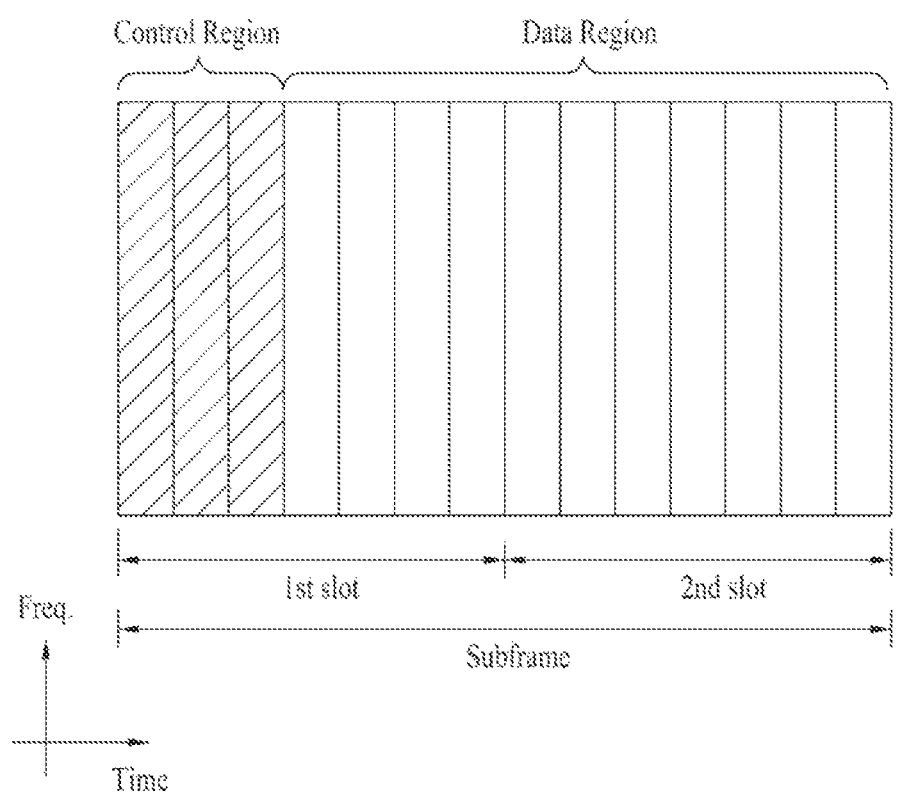
FIG. 6 illustrates the structure of a downlink subframe wherein the present invention is applied.

FIG. 6 illustrates the structure of a downlink subframe wherein the present invention is applied. Referring to FIG. 6, a subframe includes 2 slots in the time domain. A maximum of 3 foremost OFDM symbols of a first slot within the subframe collectively configure a control region, wherein the control channels are assigned thereto, and the remaining symbols collectively configure a data region, wherein a Physical Downlink Shared Channel (PDSCH) is assigned thereto. A downlink control channel includes a Physical Downlink Control Channel (PDCCH). Herein, the control information being transmitted through the PDCCH is referred to as Downlink Control Information (DCI). The DCI may include uplink resource allocation information, downlink resource allocation information, and uplink transmission power control commands on random UE groups. The PDCCH may carry and deliver transmission format information and resource allocation information of a downlink shared channel (DL-SCH), paging information within a paging channel (PCH), system information within the DL-SCH, resource allocation information on higher layer control messages, such as random access responses being transmitted within the PDSCH, transmission power control command sets on individual UEs within random UE groups, information on transmission power control commands, information on the activation of a Voice of Internet Protocol (VoIP), and so on. Multiple PDCCHs may be transmitted in a single control region. The eNB decides the PDCCH format depending upon the DCI that is to be transmitted to the UE and adds a CRC to the control information. The CRC is masked with a unique identifier (i.e., Radio Network Temporary Identifier (RNTI)) in accordance with the purpose or owner of the PDCCH. More specifically, if the PDCCH is specified for a paging message, a paging indicator identifier (e.g., a Paging-RNTI (P-RNTI)) is masked to the CRC. Also, if the PDCCH is specified for the system information, a system information identifier and a system information RNTI (S-RNTI) may be masked to the CRC. Also, in order to indicate a random access response, which corresponds to a response of the UE to the reception of a random access preamble, a random access RNTI (RA-RNTI) may be masked to the CRC.

The structure of a downlink Backhaul subframe is not very different from the above-described subframe structure. The Backhaul subframe according to the present invention may be set up as an MBSFN subframe. The MBSFN subframe may include a control region and a data region. Depending upon the settings, the control region may be allocated to one foremost OFDM symbol section to 3 foremost OFDM symbol sections within the first slot of the MBSFN subframe. Also, depending upon the settings, the data region may be allocated to the entire second slot or to sections of the second slot excluding the last symbol. Herein, the downlink control channel includes a Relay-Physical Downlink Control Channel (R-PDCCH). And, with the exception for the fact that the R-PDCCH corresponds to a relay-specific PDCCH, the R-PDCCH is similar to the PDCCH described above with reference to FIG. 6. In other words, the R-PDCCH transmits relay-specific downlink control information (DCI). For example, the R-PDCCH may carry and deliver relay-specific downlink scheduling information and relay-specific uplink scheduling information. The relay-specific downlink data are received through a Relay-Physical Downlink Shared Channel (R-PDSCH). The RN receives the R-PDCCH and receives data and/or control information through the R-PDSCH, which is designated by the R-PDCCH. Furthermore, Relay-Physical Downlink Control Channel (R-PDCCH)/Relay-Physical Downlink Shared Channel (R-PDSCH) may be allocated to the data region.

Figure 7:
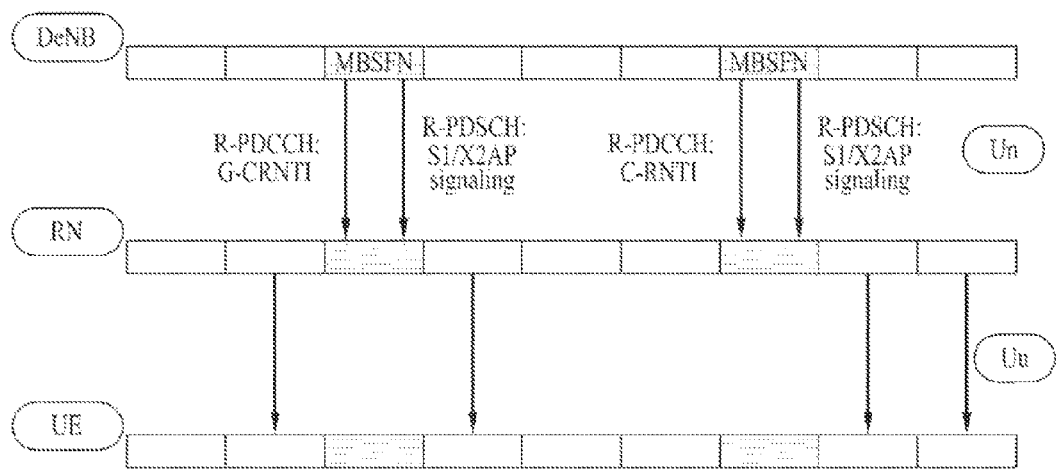
FIG. 7 illustrates a method of receiving a message according to an embodiment of the present invention.

FIG. 7 illustrates a method of receiving a message according to an embodiment of the present invention. Hereinafter, although the embodiments of the present invention are described as examples of an S1AP message between the EPC and the RN or an X2AP message between the eNB and the RN being transmitted over a wireless (or radio) interface. However, this is merely exemplary, and, therefore, the present invention will not be limited only to the examples given herein. Referring to FIG. 7, the DeNB may allocate the RN with an identifier (e.g., G-CRNTI) of an RN group to which the corresponding RN belongs. Depending upon a method of grouping multiple RNs, a plurality of RN group identifiers (G-CRNTIs) may be allocated to a single RN. As described above, the RN monitors the R-PDCCH on the MBSFN subframes. In case the G-CRNTI allocated to the corresponding RN is included in the control information, which is received through the R-PDCCH, the RN may receive messages through a corresponding R-PDSCH, based upon the control information received through the R-PDCCH. Meanwhile, the R-PDSCH may be received on the MBSFN subframes. All of the RNs belonging to the RN group may acquire messages through the same R-PDSCH. The RN does not transmit a reception response signal (e.g., HARQ ACK/NACK) for the R-PDSCH, which corresponds to the R-PDCCH having the G-CRNTI, to the DeNB. At this point, regardless of the reception response signal, the R-PDSCH and the R-PDCCH having the G-CRNTI may be repeatedly transmitted to the RN. The number of repeated transmissions may be pre-determined, and the number of repeated transmissions may be increased depending upon the channel status. Furthermore, the DeNB may notify the RNs in advance of the fixed number of repeating transmissions.

In case a response message for an S1AP or X2AP message that is received through the R-PDSCH is transmitted, the RN may send a response to the MME or eNB through the R-PUSCH. The R-PUSCH is mapped to the RN-specific logical channel and transmission channel (UL DCCH and UL SCH).

Figure 8:
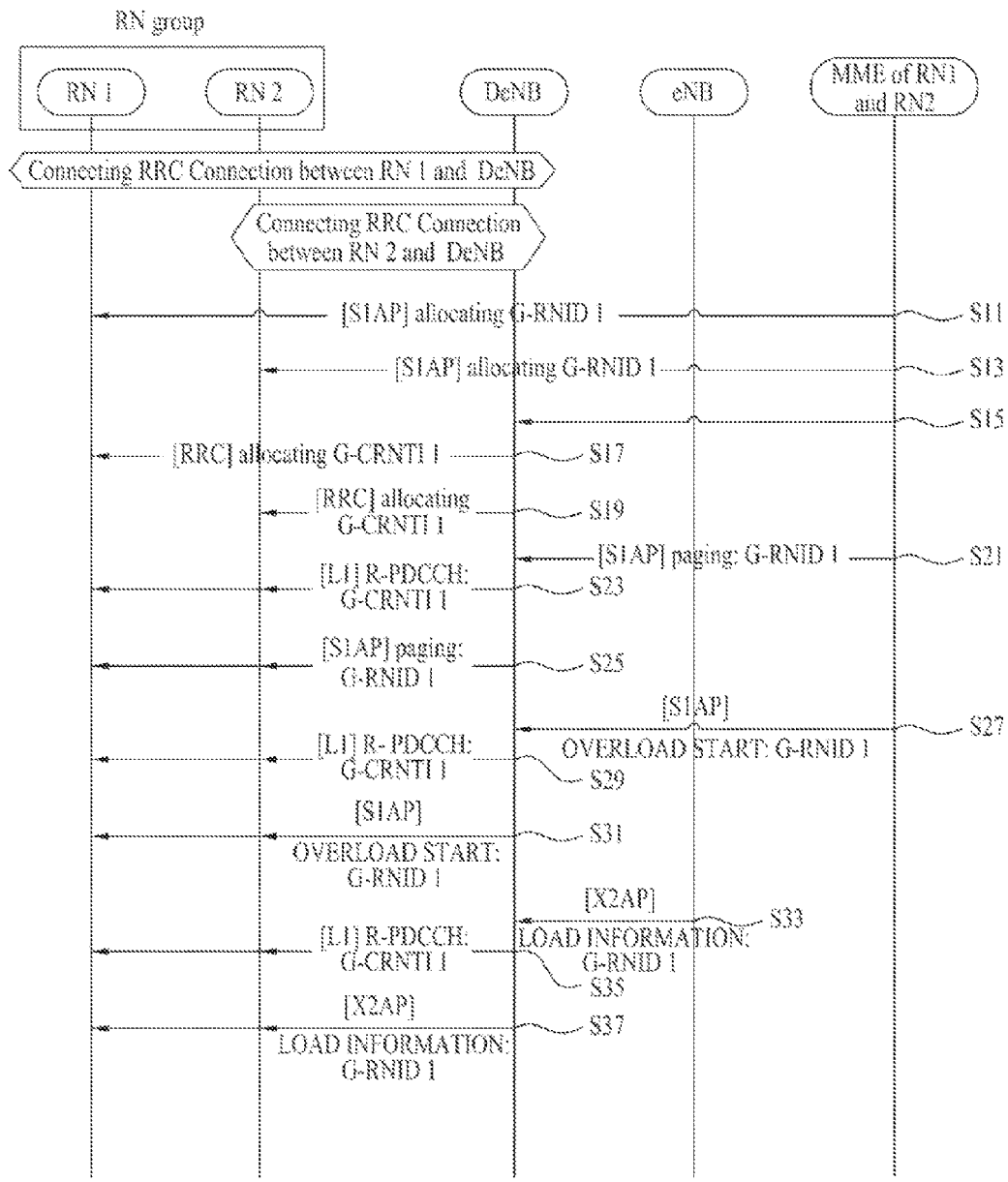
FIG. 8 illustrates a method of transmitting a message for an RN group according to an embodiment of the present invention.

FIG. 8 illustrates a method of transmitting a message for an RN group according to an embodiment of the present invention. Referring to FIG. 8, RN1 and RN2 are connected to the same Mobility Management Entity (MME), and the DeNB forms independent RRC connections with each of the RN1 and the RN2.

The MME allocates the RN1 and the RN2 to the same RN group. In order to so, the MME allocates the same value to the RN group identifier (i.e., group-RN identity (G-RNID)) (S11 and S13). Herein, different group-RN identities (G-RNIDs) are allocated to different RN groups. The MME notifies the DeNB that specific G-RNIDs have been allocated to each of the RN1 and the RN2 by using an S1AP message (S15). Subsequently, the DeNB allocates Group-Cell Radio Network Temporary Identifiers (G-CRNTI) each having the same value to the RN1 and the RN2 through the RRC message (S17 and S19). Meanwhile, allocation information of the MBSFN subframe being allocated to the RN1 and the RN2 may be included in the RRC message. Also, the DeNB may be control mapping so that one G-CRNTI corresponds to one G-RNID. Each of the RNs monitors the R-PDCCH on the MBSFN subframes. In case of detecting control information having a G-CRNTI through an R-PDCCH, the RN uses the control information, which is received through the R-PDCCH, so as to be capable of receiving related messages through the R-PDSCH, which corresponds to the R-PDCCH. More specifically, the RN may receive an S1AP message or an X2AP message, which is transmitted to a plurality of RNs, through the R-PDSCH. Such message may be delivered through a logical channel CCCH and a transmission channel DL SCH. Meanwhile, in case a G-RNID allocated to the acquired S1AP message or X2AP message exists in the corresponding message, the RN may recognize the acquired S1AP message or X2AP message as a message designated and transmitted to the RN itself. Furthermore, the RN may verify whether or not any difficulty or problem exists during the message reception using the G-RNID included in the S1AP message or X2AP message. In case the received G-RNID is not identical to the G-RNID predetermined within the RN, the reception of the message may be interrupted, or the received message may be discarded.

Meanwhile, the transmission of the S1AP message or X2AP message using the G-CRNTI may not be required each time by the Backhaul subframe. In this case, in order to prevent the waste of resource and to reduce the decoding complexity of the RN, a message transmission using the G-CRNTI may be performed by using a subset of the Backhaul subframe. For example, by using a bitmap designating some of the subframes configured of Backhaul subframes, by using a cycle period according to which the R-PDCCH having a G-CRNTI is transmitted, or by using a minimum time period during which the transmission of the R-PDCCH having a G-CRNTI is prohibited, limitations may be made on the subframe to which a R-PDCCH having a G-CRNTI can be transmitted. Additionally, in order to further reduce the decoding complexity of the relay, when both the R-PDCCH having a G-CRNTI and the R-PDCCH having a C-RNTI are detected from the subframe, to which an R-PDCCH having a G-CRNTI can be transmitted, the relay may not perform decoding on the R-PDSCH, which corresponds to the R-PDCCH having a C-RNTI.

Furthermore, the RN may determine whether or not the received Radio Network Temporary Identifier (RNTI) corresponds to the G-CRNTI through the R-PDCCH. At this point, if the RNTI is determined to correspond to the G-CRNTI, the G-CRNTI may be used to detect the R-PDCCH. Conversely, if the RNTI is determined to correspond to the C-RNTI, the reception of the corresponding R-PDCCH may be interrupted.

A message being transmitted to the RN from the DeNB may include a paging message, an OVERLOAD START message, and a LOAD INFORMATION message. However, this is merely exemplary, and, therefore, the present invention will not be limited only to the examples presented in the embodiments of the present invention. Hereinafter, the process of receiving the paging message, the OVERLOAD START message, and the LOAD INFORMATION message will now be described in detail.

The MME may include the G-RNID to the S1AP paging message and may then transmit the processed S1AP paging message to the DeNB (S21). The DeNB may transmit the control information having the G-CRNTI through the R-PDCCH (S23), and the DeNB may transmit the paging message including the G-RNID to RN1 and RN2 (S25). Herein, the DeNB may control mapping so that the G-RNID and the G-CRNTI can be mapped to be in a one-to-one correspondence.

Furthermore, when a complexion occurs, the MME may include a G-RNID in the OVERLOAD START message and may transmit the processed OVERLOAD START message to the DeNB (S27). The DeNB may transmit the control information having the G-CRNTI through the R-PDCCH (S29), and the DeNB may transmit the OVERLOAD START message including the G-RNID to RN1 and RN2 (S31). Herein, the DeNB may control mapping so that the G-RNID and the G-CRNTI can be mapped to be in a one-to-one correspondence.

Furthermore, when the interference of an uplink channel increases, the eNB may include a G-RNID to a LOAD INFORMATION message, thereby transmitting the processed message to the DeNB (S33). The DeNB may transmit the control information having the G-CRNTI through the R-PDCCH (S35), and then the DeNB may transmit the LOAD INFORMATION message including the G-RNID to RN1 and RN2 (S37). The DeNB may control mapping, so that that the G-RNID and the G-CRNTI can be mapped to be in a one-to-one correspondence.

In the description of the present invention, the transmission and reception processes of the paging message, the OVERLOAD START message, and the LOAD INFORMATION message have been described in detail with the accompanying drawings. However, it will be apparent that an OVERLOAD STOP message, an MME configuration update message, a write-replace warning request message, and a kill request message may be transmitted and received as the S1AP message, and that an error indication message, and a base station configuration update message may be transmitted and received as the X2AP message by using the above-described method.

FIG. 9 illustrates RN and DeNB configurations according to an embodiment of the present invention. Referring to FIG. 9, the RN may include a receiving module 11, a transmitting module 13, a memory 15, and a processor 17. The receiving module 11 may receive various signals, data, information, and so on, from the DeNB and the UE. The transmitting module 13 may transmit various signals, data, information, and so on, to the DeNB and the UE. The memory 15 may temporarily store the received signals, data, information, and so on. The processor 17 may control the receiving module 11 to receive control information including a G-CRNTI through the R-PDCCH on the MBSFN subframe. Also, when control information having the G-CRNTI is received through the R-PDCCH, based upon the control information included in the R-PDCCH, the processor 17 may receive the related messages through the R-PDSCH. Additionally, based upon whether or not the G-RNID exists within the related message received through the R-PDSCH, the processor 17 recognizes the received related message as a message designated itself. And, then the processor 17 may recheck whether or not any error exists the received related message based upon whether or not the G-RNID exists within the related message received through the R-PDSCH. Furthermore, the G-CRNTI and the G-RNID are mapped to be in a one-to-one correspondence. And, herein, the related message may be one of a paging message, an overload start message, and a load information message.

Meanwhile, the DeNB may include a receiving module 21, a transmitting module 23, a memory 25, and a processor 27. The receiving module 21 may receive various signals, data, information, and so on, from the UE and the RN. Also, the transmitting module 23 may transmit various signals, data, information, and so on, to the UE and the RN. The memory 25 may temporarily store the operated information, the received signals, data, and so on. Herein, the memory 25 may also be replaced by another element, such as a buffer (not shown). The processor 27 may control the transmitting module 23 to transmit control information having a G-CRNTI through the R-PDCCH on the MBSFN subframe. Also, the processor 27 may control the transmitting module 23 to transmit a G-RNID through the R-PDSCH. Additionally, the processor 27 may control mapping so that the G-CRNTI and the G-RNID can be mapped to be in a one-to-one correspondence. Furthermore, depending upon a method of grouping multiple RNs, the processor 27 may control allocation so that multiple G-CRNTIs and G-RNIDs can be allocated to a single RN.

As described above, the method of receiving a message in a communication system using a relay process limited to an air interface and the apparatus of the same according to the present invention is capable of efficiently using the wireless (or radio) resource.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of receiving a message by a relay node in a mobile communication system, the method comprising:
   receiving control information masked by a first group identifier on a backhaul subframe; and
   receiving the message scheduled by the control information if the first group identifier indicates a group including the relay node,
   wherein the message includes a second group identifier, the second group identifier corresponding to the first group identifier,
   wherein the message is retransmitted repeatedly as much as a predetermined number regardless of a reception status of the message,
   wherein the message is an S1 interface message or an X2 interface message, and
   wherein an S1 interface is an interface between a base station and a mobility management entity (MME) and an X2 interface is an interface among base stations.

2. The method of claim 1, wherein the first group identifier is assigned by the base station or the MME.

3. The method of claim 2, wherein the second group identifier is assigned by the base station or the MME.

4. The method of claim 3, wherein the base station or the MME assigns a plurality of second group identifiers including the second group identifier to the relay node.

5. The method of claim 4, wherein the relay node belongs to a plurality of relay node groups, and each of the plurality of second group identifiers corresponds to each of the plurality of relay node groups.

6. The method of claim 1, wherein the backhaul subframe is a MBSFN (Multicast/Broadcast over a Single Frequency Network) subframe.

7. The method of claim 2, wherein the message is retransmitted by the base station or the MME according to a hybrid automatic repeat request (HARQ) operation.

8. The method of claim 7, wherein a feedback including the reception status of the message is not transmitted.

9. The method of claim 1, wherein the control information is received through a R-PDCCH (Relay-Physical Downlink Control Channel), and the message is received through a R-PDSCH (Relay-Physical Downlink Shared Channel).

10. The method of claim 1, wherein the message is an S1 interface message comprising a paging message, an MME configuration update message, an overload start message, an overload stop message, a write-replace warning request message, or a kill request message.

11. The method of claim 1, wherein the message is an X2 interface message comprising a load information message, an error indication message, or a base station configuration update message.

12. A method of transmitting a message by a network node in a mobile communication system, the method comprising:

transmitting, to a relay node, control information masked by a first group identifier indicating a group including the relay node on a backhaul subframe; and transmitting the message scheduled by the control information to the relay node, wherein the message includes a second group identifier, the second group identifier corresponding to the first group identifier, wherein the message is retransmitted repeatedly as much as a predetermined number, regardless of a reception status of the message, wherein the message is an S1 interface message or an X2 interface message, and wherein an S1 interface is an interface between a base station and a mobility management entity (MME) and an X2 interface is an interface among base stations.

13. The method of claim 12, further comprising;
assigning the first group identifier to the relay node.

14. The method of claim 13, further comprising:
assigning the second group identifier to the relay node.

15. The method of claim 13, further comprising:
assigning a plurality of second group identifiers including the second group identifier to the relay node.

16. The method of claim 15, wherein the relay node belongs to a plurality of relay node groups, and each of the plurality of second group identifiers corresponds to each of the plurality of relay node groups.

17. The method of claim 12, wherein the backhaul subframe is a MBSFN (Multicast/Broadcast over a Single Frequency Network) subframe.

18. The method of claim 13, further comprising:
retransmitting the message to the relay node according to a hybrid automatic repeat request (HARQ) operation.

19. The method of claim 18, wherein a feedback including the reception status of the message is not transmitted by the relay node.

20. The method of claim 12, wherein the control information is transmitted through a R-PDCCH (Relay-Physical Downlink Control Channel), and the message is transmitted through a R-PDSCH (Relay-Physical Downlink Shared Channel).

21. The method of claim 12, wherein the message is an S1 interface message comprising a paging message, an MME configuration update message, an overload start message, an overload stop message, a write-replace warning request message, or a kill request message.

22. The method of claim 12, wherein the message is an X2 interface message comprising a load information message, an error indication message, or a base station configuration update message.

* * * * *